United States Patent [19]

Eberhard et al.

[11] Patent Number: 4,610,438
[45] Date of Patent: Sep. 9, 1986

[54] HYDRAULICALLY DAMPED ELASTIC MOUNTING

[75] Inventors: Günter Eberhard, Gehrden; Jürgen Heitzig, Hanover, both of Fed. Rep. of Germany

[73] Assignee: Continental Gummi-Werke Aktiengesellschaft, Hanover, Fed. Rep. of Germany

[21] Appl. No.: 578,566

[22] Filed: Feb. 9, 1984

[51] Int. Cl.$^4$ ............................................. F16F 1/36
[52] U.S. Cl. ............................... 267/8 R; 138/31; 138/40; 188/298; 248/562; 267/140.1
[58] Field of Search .................... 267/140.1, 35, 8 R, 267/8 C, 64.25, 64.27, 63 A; 188/268, 275, 298; 248/562–567, 636; 183/311, 320, 322.22, 322.5, 322.13–322.15, 380; 137/514, 533.17, 332; 138/31, 40, 42, 44; 251/332

[56] References Cited

U.S. PATENT DOCUMENTS

| | | | |
|---|---|---|---|
| 1,304,311 | 5/1919 | Heldrich | 188/298 |
| 2,107,200 | 2/1938 | Kennon | 251/332 |
| 2,387,066 | 10/1945 | Harding | 188/298 X |
| 2,531,532 | 11/1950 | Rossman | 188/322.13 X |
| 3,151,597 | 10/1964 | Larsen | 188/268 X |
| 3,368,807 | 2/1968 | Thrasher | 267/35 |
| 3,788,587 | 1/1974 | Stemmler | 248/562 |
| 4,483,521 | 11/1984 | Kakimoto | 248/562 X |

FOREIGN PATENT DOCUMENTS

| | | | |
|---|---|---|---|
| 98330 | 1/1984 | European Pat. Off. | 267/140.1 |
| 12600 | 6/1880 | Fed. Rep. of Germany | 137/332 |
| 2524951 | 10/1983 | France | 267/140.1 |
| 524799 | 4/1955 | Italy | 188/320 |

Primary Examiner—Bruce H. Stoner, Jr.
Assistant Examiner—Michael P. Gilday
Attorney, Agent, or Firm—Becker and Becker, Inc.

[57] ABSTRACT

A hydraulically damped elastic engine mounting having a ring-shaped rubber spring member which takes up static and dynamic loads and is equipped with a damping disk immersed in a damping fluid in order to provide hydraulic damping. The damping disk is movably mounted with axial play between spherical or conical buffer surfaces, and is provided in the vicinity of the buffer surfaces with passages through which the damping fluid can flow. The free path of the disk governs the damping applied, and at the same time prevents undesirable impact noise by the special design of the parts which move in relation to each other. Moreover, the damping disk may be constructed in such a way that interfering cavitation phenomena produced in the two surfaces are suppressed. This ensures that the damping device is fully effective in all vibration ranges and under all conditions occurring while the vehicle is being driven. This may be effected by providing the damping disk with a large number of holes distributed over its entire surface, by making the damping disk star-shaped with several vanes, or by making the damping disk somewhat dish-shaped.

5 Claims, 7 Drawing Figures

HYDRAULICALLY DAMPED ELASTIC MOUNTING

BACKGROUND OF THE INVENTION

1. Field of the Invention

The present invention relates to hydraulically damped elastic mountings, particularly for the engines of motor vehicles; the mountings have a ring-shaped rubber spring member which seals off a pot-shaped housing containing the damping fluid, and include a damping disk which is immersed in the damping fluid and is mounted on a rigid connecting member which passes centrally through the spring member with a tight fit.

2. Description of the Prior Art

In known mountings of this general type, (e.g. German Offenlegungsschrift No. 2,712,641), the damping disk is connected to a connecting member, which generally absorbs the engine load directly, by means of an elastically deformable transmission member. All experience shows that connections of this type, and similar continuous connections between the damping disk and the connecting member, in practice produce undesirable noise in the mountings. For improved acoustic behavior of the mounting, however, there is desirable that the damping disk should not make contact up to a limiting amplitude of movement of the spring, and entirely avoid the need for damping in this range of vibrations.

An object of the present invention is to provide in the lower range of vibrational amplitudes, freedom of movement for the damping disk which is independent of the movement of the spring of the mounting, thus ensuring the necessary acoustic decoupling, while at the same time avoiding the hazard of undesirable impact noise resulting therefrom.

A further object of the present invention to ensure undisturbed functioning of the damping mechanism in elastic engine mountings, regardless of varying external conditions, over the entire range of vibrations without any deficiency in the specified performance.

BRIEF DESCRIPTION OF THE DRAWINGS

These and other objects and advantages of the present invention will appear more clearly from the following specification in conjunction with the accompanying drawings, in which.

SUMMARY OF THE INVENTION

Figure 1:
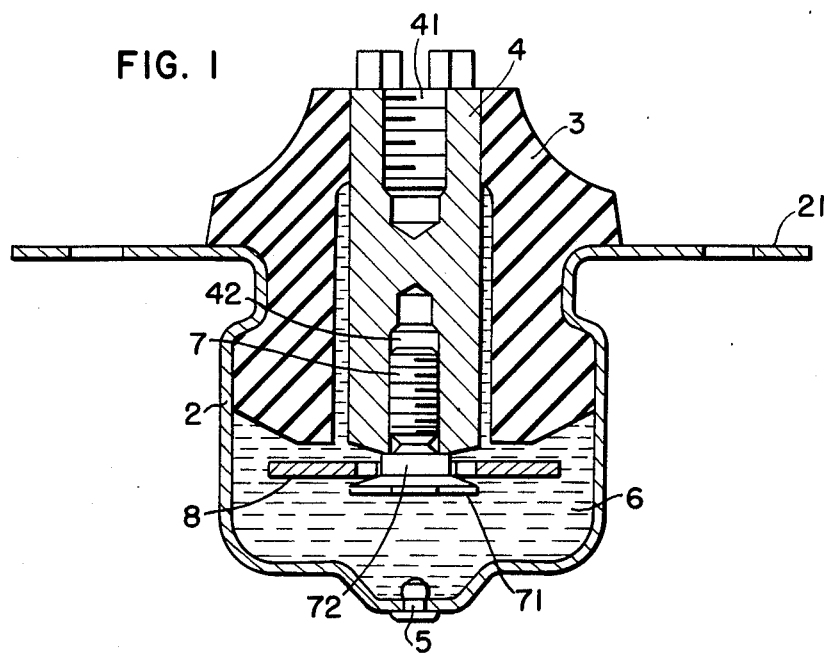
FIG. 1 is a longitudinal sectional view of one inventive embodiment of hydraulically damped elastic engine mounting.

The hydraulically damped elastic mounting of the present invention is characterized primarily in that the damping disk is manufactured from a rigid material, is movable in an axial direction and is disposed on the connection member between spherical or conical buffer surfaces which arch back or are inclined outwards, and is provided in the vicinity of the contact or buffer surfaces with holes or recesses for the flow of the damping fluid.

In a practical embodiment of the concept of the present invention, the damping disk can be axially movably yet positively guided on the shaft of a set screw which is inserted into the connecting member. In other words, the damping disk makes radial contact on all sides. Pursuant to a further important subsidiary characteristic of the present invention, the holes in the damping disk for the passage of fluid are constructed as recesses which are open toward, and are distributed at mutual angular spacings around the periphery of, the central hole for the shaft of the set screw. The head of the set screw may have a substantially identical diameter to that of the cylindrical connecting member, and its surface which faces the damping disk may have a spherical or conical shape in the same way as the end face of the connecting member.

The present invention realizes one of the stated objects with surprisingly simple means. The damping disk, which is guided on the shaft of the set screw in a positive manner without any possibility of deviation in a radial direction, has the limited axial play in both directions which is necessary for the desired acoustic decoupling, whereby the possibility exists that the amount of free movement, and thus the range of undamped vibration, can be altered by appropriate adjustment of the supporting set screw in accordance with the prevailing or initial conditions. The resulting increased risk of impacts, rattling, and knocking of the damping disk is avoided, however, by the special design and arrangement of the flow passages in association with the spherical or conical configuration of the buffer surfaces. In cooperation with the parts which move in relation to each other, the flow and displacement forces in the closing stage of the free movement increase sharply in such a way that direct impact between the metal surfaces is always, and under all circumstances, reliably prevented. The attachment of known noise-damping cushioning pads, with the disadvantage of greater complexity of construction and greater length, henceforth can be avoided.

The axial play in the radially positive support of the guided damping disk results in desired acoustic uncoupling, with small-amplitude inward and outward movements of the mounting taking place without damping and without any involvement of the damping disk, which is restrained in the liquid; the disk is first displaced and carried along when a selectable amplitude of vibration is exceeded. Mountings of this type in general fulfill expectations. However, under certain conditions they unexpectedly exhibit disturbances in their damping properties, the cause of which could not be found in the condition of the affected parts of the mounting, and which therefore could not be eliminated by purely empirical attempts at improvement.

It is therefore proposed, pursuant to a further development of the present invention, that the damping disk be stabilized against cavitation.

In practical tests with the inventive mounting, the means envisaged in the invention have proved to be correct. The reason for the disturbances which otherwise occur in the damping mechanism must accordingly be attributed to the apparently uncontrolled sudden production and break up of vapor bubbles on the surfaces of the damping disk, which has the liquid circulating about it, when the saturated vapor pressure of the damping fluid, which is governed by the prevailing temperature, is reached and again departed from. Although up to now only the erosion-like loss of material from the affected surfaces has been regarded as a disadvantage deriving directly from these phenomena, other functional difficulties with the damping device which could not be influenced by any other means also surprisingly have been completely overcome when cavitation is suppressed.

The practical realization of the concept of the invention requires the flow processes, in the range of movement of the damping disk, to be influenced, with the object of preventing the occurrence, at the surfaces of the disk, of the reduced pressure which gives rise to the bubbles of saturated vapor. This can be accomplished pursuant to the present invention by, for example, providing the damping disk with a large number of holes, for the flow of the damping fluid, distributed over its entire surface. The diameters of the flow holes may increase in a direction from the center to the external perimeter of the damping disk. In an alternative embodiment, the damping disk may be star-shaped with several vanes in the form of truncated segments of a circle distributed at opposing angular spacings about its periphery. The vanes may be rotated out of the plane of the damping disk. In a further alternative embodiment, the damping disk may be dish-shaped, with an essentially axially flanged edge. The edge of the damping disk may be flanged to an extent corresponding to a multiple of its wall thickness. The edge of the damping disk may be flanged in a direction away from the spring member.

DESCRIPTION OF PREFERRED EMBODIMENTS

Referring now to the drawings in detail, the mounting illustrated in FIG. 1 comprises a pot-shaped housing 2, made of sheet steel, light metal, or any other metallic material, which is provided with bent-over or angular securing flanges 21. A ring-shaped rubber spring member 3 is pressed and locked by means of its shape into the upper region of the housing 2, and at the same time forms the upper seal. A metal connecting member 4 passes centrally through the full length of the spring member 3, the arrangement being such that the connecting member 4 is only tightly fitting in the upper portion of the spring member 3, with the greater part of the length of the connecting member 4 being free to move relative thereto with radial play. The housing 2 can be filled with a suitable high viscosity damping fluid 6 by means of a filling hole which can be sealed by a stopper 5.

In the mounted condition, the mounting is secured to a load-bearing member of a motor vehicle (not shown) on the housing side by means of the flanges 21, while the supported engine rests directly on the connecting member 4, which is provided with a threaded hole 41 for receiving a securing bolt (not shown) of the engine, thereby transmitting part of its weight to the spring member 3. The static load transmitted in this way need not be considered for the present purpose; as far as the method of operation of the inventive mounting is concerned, only the dynamic movements deriving from inward and outward oscillations or deflections are of importance.

Figure 1A:
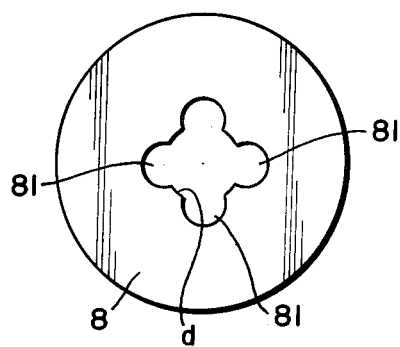
FIG. 1a is a plan view of the damping disk of the mounting of FIG. 1.

The lower internal end face of the connecting member 4 is immersed in the damping fluid 6, and is externally decreasingly bevelled in the form of a truncated cone or sphere at a comparatively small angle; the internal surface of the head 71 of a set screw 7, which is inserted into a threaded hole 42 in the connecting member 4, has the same conical or spherical shape as the lower end face of the connecting member 4. The set screw 7 is used to attach damping disk 8 to the connecting member 4, for which purpose the part of the shaft of the screw directly connected to the head 71 is provided with a shoulder-like cylindrical collar 72. The damping disk 8, which is in the form of a virtually undeformable, planar disk manufactured from metal or other rigid material, is provided with a central hole d dimensioned to correspond with, or be only slightly greater than, the external diameter of the collar 72, so that in the mounted condition illustrated in FIG. 1, it is introduced with a capacity for axial movement but with virtually no radial play between the conical surfaces of the parts 4 and 71. As can be seen from the plan view in FIG. 1a, the central hole d is constructed somewhat in the manner of a four-leafed clover by the provision of four segmental recesses 81 which are angularly disposed about its periphery. The radial guidance on the collar 72, however, is not affected thereby.

Small in and out movements of the mounting are undamped because of the described axially movable arrangement of the damping disk 8. The disk then remains uniformly at rest in the damping fluid, and only comes into contact with the connecting member 4, or the head of the set screw 7, when a given amplitude of vibration is exceeded. Contact with the two metal components 4 and 71 under all circumstances is greatly restrained as a result of the throttled flow of damping fluid through the recesses 81, and of the externally conically decreasing contact surfaces, and is therefore free of knocking or impact noise.

Figure 2:
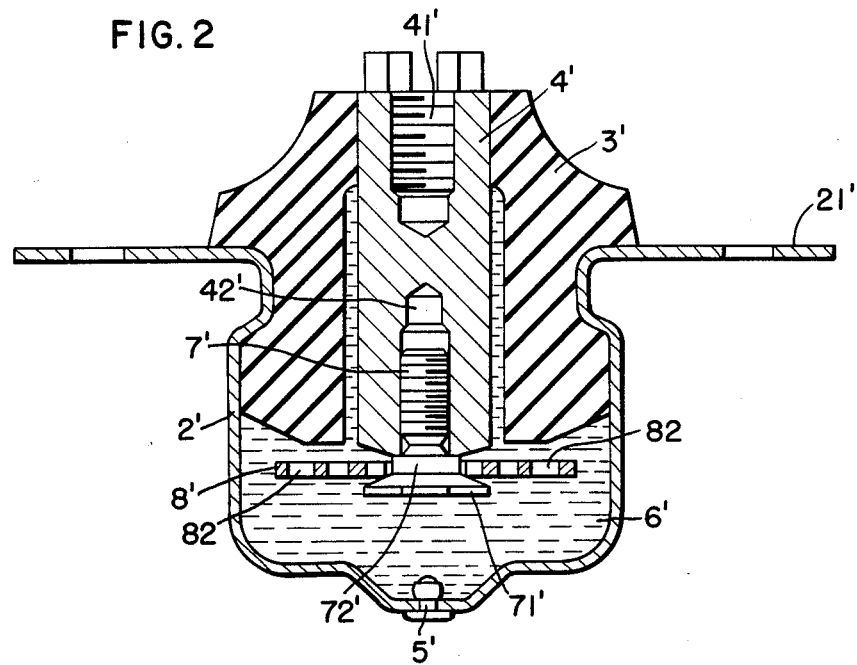
FIG. 2 is a longitudinal sectional view of another inventive embodiment of a hydraulically damped elastic engine mounting.

The engine mounting illustrated in FIG. 2 corresponds in many respects to the mounting of FIG. 1. Therefore, similar parts are designated with the same reference numerals, followed by a prime ('), and will not be described again.

Figure 2A:
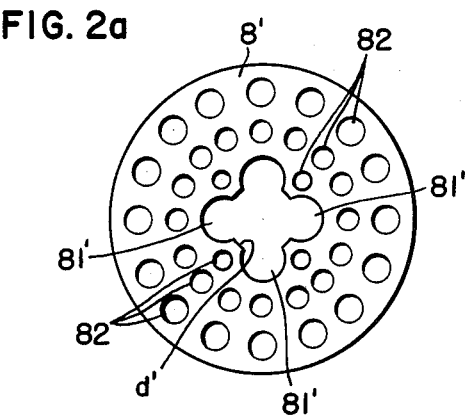
FIG. 2a is a plan view of the damping disk used in the mounting of FIG. 2.

The main difference between the engine mounting of FIGS. 1 and 2 lies in the configuration of the damping disks 8 and 8'. Whereas the disk 8 was only provided with a single, uniquely shaped central hole d, the damping disk 8' has distributed over its entire surface a large number of holes 82 for the flow of damping fluid 6' (FIGS. 2 and 2a). By means of these flow holes, which are provided in addition to the recesses 81', the low pressure peaks formed on the disk surfaces on that side remote from the flow by the more rapid displacements of the disk in the damping fluid are prevented or are reduced to such an extent that vapor bubbles never occur. For reasons of simplicity in manufacture, there is recommended that the flow holes 82 be constructed with increasing diameters in radial sequence progressively with the likewise increasing disk diameter.

Figure 3:
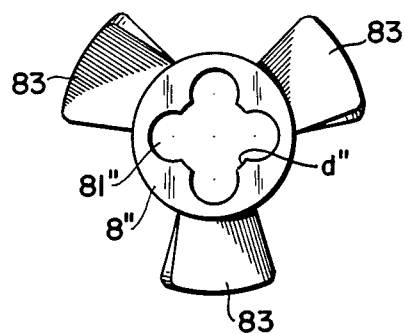
FIG. 3 is a plan view of an alternative embodiment of the damping disk.
Figure 3A:
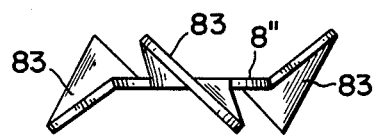
FIG. 3a is a side view of the damping disk of FIG. 3.

The same cavitation-stabilizing effect is achieved with the embodiment of the damping disk 8" illustrated in FIGS. 3 and 3a and substantially in the form of a star having three vanes 83 which are in the shape of truncated segments of a circle, are rotated out of the plane of the disk, and are distributed over the periphery in predetermined or opposing angular spacings.

Figure 4:
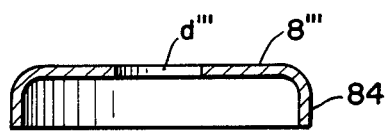
FIG. 4 is a median cross-sectional view of a further embodiment of the damping disk.

Another embodiment of the present invention is illustrated in FIG. 4. In this case, the damping disk 8''' is somewhat dish-shaped with an essentially axially flanged edge 84. The sectional drawing shows the damping disk in its appropriate orientation with respect to the mounting of FIG. 1, with the flanged edge 84 being directed away from the spring member 3.

The present invention is, of course, in no way restricted to the specific disclosure of the specification and drawings, but also encompasses any modifications within the scope of the appended claims.

What we claim is:

1. A hydraulically damped elastic mounting for a drive motor in motor vehicles, the improvement therewith comprising:
    a pot-shaped housing containing damping fluid;
    a ring-shaped rubber spring member for sealing-off said housing;
    a rigid connecting member which passes centrally through said spring member forming a tight fit therewith; said connecting member being provided with predetermined buffer surfaces which essentially face one another, said buffer surfaces extending inclined in an outward radial direction and disposed continuously further away from one another; and
    a damping disk of rigid material, said disk being immersed in said damping fluid, and being disposed on said connecting member, between said buffer surfaces, in such a way as to be movable in an axial direction although guided positively in radial direction; said damping disk furthermore being provided, in the vicinity of said buffer surfaces, with passages for the flow of said damping fluid; said damping disk being stabilized against cavitation; said damping disk being star-shaped and comprising several vanes which are in the form of truncated segments of a circle, and are distributed about the periphery of said damping disk at predetermined angular spacings.

2. A mounting according to claim 1, in which said connecting member has inserted therein a set screw having a shaft; said damping disk is axially movably yet positively guided on said shaft of said set screw.

3. A mounting according to claim 2, in which said damping disk is provided with a central hole for said shaft of said set screw; and in which said passages for the flow of said damping fluid are recesses which are distributed at mutual angular spacings about the periphery of said central hole, and are open toward the latter.

4. A mounting according to claim 3, in which said set screw is provided with a head which has substantially the same diameter as does said connecting member; said connecting member has an end face which faces said damping disk and forms one of said buffer surfaces, and said head of said set screw has a surface which faces said damping disk and forms the other of said buffer surfaces, with said buffer surfaces having substantially identical spherical shapes.

5. A mounting according to claim 1, in which said vanes are rotated out of the plane of said damping disk.

* * * * *